United States Patent [19]
Lawrence et al.

[11] Patent Number: 6,141,475
[45] Date of Patent: Oct. 31, 2000

[54] OPTICAL WAVEGUIDE WITH DISSIMILAR CORE AND CLADDING MATERIALS, AND LIGHT EMITTING DEVICE EMPLOYING THE SAME

[75] Inventors: Brian L. Lawrence, Watervliet; Kevin J. McCallion, Albany, both of N.Y.

[73] Assignee: Molecular OptoElectronics Corporation, Watervliet, N.Y.

[21] Appl. No.: 09/121,454

[22] Filed: Jul. 23, 1998

[51] Int. Cl.$^7$ ...................................................... G02B 6/02
[52] U.S. Cl. .......................... 385/123; 385/124; 385/125; 372/6
[58] Field of Search .................................. 385/123, 124, 385/125, 126, 127, 128; 372/6, 69, 70

[56] References Cited

U.S. PATENT DOCUMENTS

| | | | |
|---|---|---|---|
| 3,590,004 | 6/1971 | Woodcock | 252/301.4 |
| 4,428,646 | 1/1984 | Lighty | 385/124 |
| 5,037,181 | 8/1991 | Byer et al. | 385/144 |
| 5,045,397 | 9/1991 | Jensen | 428/429 |
| 5,201,977 | 4/1993 | Aoshima | 156/153 |
| 5,349,600 | 9/1994 | Shinbori et al. | 372/92 |
| 5,441,803 | 8/1995 | Meissner | 428/220 |
| 5,563,899 | 10/1996 | Meissner et al. | 372/39 |
| 5,717,517 | 2/1998 | Alfano et al. | 359/342 |
| 5,846,638 | 12/1998 | Meissner | 428/220 |

FOREIGN PATENT DOCUMENTS

| | | |
|---|---|---|
| 0416301A2 | 3/1991 | European Pat. Off. . |
| 0 510 883 A2 | 10/1992 | European Pat. Off. . |
| 0 511 069 A1 | 10/1992 | European Pat. Off. . |
| 61-228403 | 10/1986 | Japan . |
| 62-069207 | 3/1987 | Japan . |
| 2-001831A | 1/1990 | Japan . |
| 6-34829 | of 1994 | Japan . |
| 06174955 | 6/1994 | Japan . |
| 8-316562 | of 1996 | Japan . |
| 8-295524 | 11/1996 | Japan . |

OTHER PUBLICATIONS

K. Suto et al., "Semiconductor Raman Laser with Pump Light Wavelength in the 800 nm Region", 1046 Journal of the Electrochemical Society, 140 (1993) Jun., No. 6, Manchester, NH, US, 8 pp.

Rogin, P. and Hulliger, J., "Epitaxial Nd:YLF linear waveguide laser," Optics Letters, vol. 22, No. 22, pp. 1701–1703 (Nov. 15, 1997).

Izatt, Joseph A., Kulkami, Manish D., Kobayashi, Kenji, Sivak, Michael V., Barton, Jennifer, K, Welch, and Ashley J., "Optical Coherence Tomography For Biodiagnostics." Optics & Photonics News, pp. 41–47 and 65 (May 1997).

Li, Chen Chung, Kim, Hong Koo, and Migliuolo, Michele, "Er–Doped Glass Ridge–Waveguide Amplifiers Fabricated with a Collimated Sputter Deposition Technique," IEEE Photonics Technology Letters, vol. 9, No. 9, pp. 1223–1225 (Sep. 1997).

Field, S.J., Hanna, D.C., Large, A.C., Shepherd, D.P., and Tropper, A.C., "Ion–implanted Nd:GGG channel waverguide laser," Optics Letters, vol. 17, No. 1, pp. 52–54 (Jan. 1, 1992).

Sanford, N.A., Aust, J.A., Malone, K.J., and Larson, D.R., "Nd:LiTaO$_3$ waveguide laser," Optics Letters, vol. 17, No. 22, pp. 1578–1580, (Nov. 15, 1992).

*Primary Examiner*—Phan T. H. Palmer
*Attorney, Agent, or Firm*—Heslin & Rothenberg, P.C.

[57] ABSTRACT

An optical waveguide, radiation emitting device employing the same, and process for fabricating the radiation emitting device are provided. The optical waveguide has a core fabricated of a first material with a first index of refraction and cladding surrounding the core fabricated of a second material with a second index of refraction. The core is an active material which emits radiation at a desired wavelength when pumped with radiation of a predetermined wavelength, and the first material and second material are dissimilar materials, having been separately fabricated and subsequently physically assembled as the waveguide. The light emitting device employing the optical waveguide is configured either as an amplified spontaneous emission (ASE) source or laser source employing appropriate reflective materials at the ends of the optical waveguide.

24 Claims, 4 Drawing Sheets

OPTICAL WAVEGUIDE WITH DISSIMILAR CORE AND CLADDING MATERIALS, AND LIGHT EMITTING DEVICE EMPLOYING THE SAME

CROSS-REFERENCE TO RELATED APPLICATION

This application contains subject matter which is related to the subject matter of commonly assigned and co-filed U.S. patent application Ser. No. 09/121,455, entitled "Method For Fabricating An Optical Waveguide," by McCallion et al., filed Jul. 23, 1998, which is hereby incorporated herein by reference in its entirety.

TECHNICAL FIELD

The present invention relates in general to optical waveguide light emitting sources, and more particularly, to an optical channel waveguide structure having a core and surrounding cladding which comprise physically distinct materials, and to a radiation emitting device employing the same in either an amplified spontaneous emission (ASE) or laser configuration.

BACKGROUND OF THE INVENTION

A broadband ASE source configured within the telecommunications windows of optical fibers would have application as a test instrument for the communications industries (e.g., telecommunications, cable television, etc.). In general, the wavelength band over which a fiber-optic communication system works is governed by the availability of optical amplifiers for that band. It thus becomes necessary to test equipment over the same wavelengths where amplifiers exist. In the 1500 nm window of optical fibers, erbium-doped fiber amplifiers (EDFA) have proven to be adequate for fabrication of reasonably priced ASE sources. However, sources in the 1300 nm window are a different matter. Currently, semiconductor optical amplifier (SOA)-based sources are available but they are costly and very unstable as a result of the strong pumping needed to obtain the necessary high powers. Praseodymium-doped fibers have also become available, but unfortunately they are limited to covering the 1290 nm to 1315 nm spectral range, no where near the full 1280 nm to 1345 nm available in the optical fiber. Beyond test equipment, there are emerging applications in communications where broadband ASE sources can be used as transmitters themselves, such as an optical code division multiple access (O-CDMA).

Other applications have also recently been developed whereby a high-power, low-coherence, broadband source can be used in imaging. In particular, optical coherence tomography (OCT) uses the low coherence as a gating mechanism to image various tissues in the body by interfering a beam from a reference arm with one reflected from the sample tissues. Because the process is based on interference, it is sensitive to amplitude fluctuations in the source. In addition, because various tissues in the body absorb and reflect at different wavelengths, the ability to provide sources at any needed wavelength becomes a distinct advantage. Currently, only the SOA-based and EDFA-based ASE sources are commercially available for OCT. Unfortunately, these sources are also relatively expensive.

As a further example, an ASE source would have application in fiber gyroscopes. These devices work by interfering beams in two arms of an optical-fiber based interferometer. Due to the Doppler effect, light traveling parallel to the direction of rotation is accelerated and light traveling antiparallel is slowed. Because the device is interferometric, it is extremely sensitive and requires very stable sources. Unfortunately, because it also needs to be rotated, the device needs to be compact. Current SOA sources are too bulky and unstable to be utilized in fiber gyroscopes.

Presently, there are several devices which can provide high-power, broadband, low-coherence radiation coupled into optical fibers. One class of devices is based on semiconductors and can be divided into two groups. The first group is composed of super luminescent light emitting diodes (LEDs) and the other group is based on semiconductor optical amplifiers (SOAs) that are run without any input signal, and thus generate amplified spontaneous emission (ASE). The second class of devices are based on optical fibers doped with rare-earth ions. These fibers are normally used as in-line optical amplifiers, but when used without signal inputs can generate broadband ASE.

There are a number of techniques in the art today for fabricating optical channel waveguides. These include ion-exchange in glass substrates, ion indiffusion or proton exchange in $LiNbO_3$ substrates, pattern definition by laser ablation, photolithography of spun polymer films, and epitaxial growth and selective etching of compound semiconductor and doped crystalline films. In general, the goal of each of these channel fabrication techniques has been to produce waveguides which support a single guided mode of propagation. Also, a disadvantage of today's techniques is that they cannot be used with a significant number of useful optical materials, such as laser crystals. Further, these approaches are all limited to similar materials for use in defining the core and cladding. For example, ion implantation used in glass integrated optical structures, ion diffusion used in doped lithium niobate waveguides, vapor deposition used in sputtered, doped glass structures, or epitaxial growth used in doped crystalline devices.

In view of the above, a need exists in the industry for an optical waveguide and radiation emitting device employing the same which allows the core and cladding materials to comprise dissimilar structural and/or chemical materials, and which can be more cost efficiently produced, for example, for the various applications discussed above.

DISCLOSURE OF THE INVENTION

Briefly summarized, the invention comprises in one aspect an optical waveguide which includes a core fabricated of a first material having a first index of refraction. The first material comprises an active material which emits radiation at a desired wavelength when pumped with radiation of a predetermined wavelength. A cladding is attached to and at least partially surrounds the core. The cladding is fabricated of a second material which has a second index of refraction, wherein the second index of refraction is lower than the first index of refraction. Additionally, the first material and the second material comprise physically dissimilar materials.

In another aspect, a radiation emitting device is provided which includes an optical waveguide having a first end and a second end. The optical waveguide further includes a core fabricated of a first material having a first index of refraction. The first material comprises an active material which emits radiation at a desired source wavelength when pumped with radiation of a predetermined wavelength. A cladding, which is fabricated of a second material having a second index of refraction, is attached to and at least partially surrounds the core. The second index of refraction is lower than the first index of refraction, and the first material and second material comprise dissimilar materials. The radiation emitting device further includes a first optically reflective material and a second optically reflective material. The first optically reflective material is disposed over the first end of the optical waveguide, while the second optically reflective material is disposed over the second end of the waveguide. The first optically reflective material is fabricated to allow pump radiation at the predetermined wavelength into the optical waveguide, and the second optically reflective material is fabricated to allow radiation emission from the optical waveguide at the desired source wavelength.

In a further aspect, a method for fabricating a radiation emitting device is provided. The method includes: forming an optical waveguide having a core comprising a first material with a first index of refraction and cladding adhesively attached to and at least partially surrounding the core, the cladding comprising a second material with a second index of refraction, wherein the second index of refraction is lower than the first index of refraction, and wherein the first material comprises an active material which exhibits optical fluorescence when stimulated and the first material and the second material comprise structurally or chemically dissimilar materials; applying a first optically reflective material over a first end of the optical waveguide, wherein the first optically reflective material is fabricated to allow pump energy at a predetermined wavelength into the optical waveguide; and applying a second optically reflective material over a second end of the optical waveguide, wherein the second optically reflective material is fabricated to allow radiation emission from the optical waveguide at the desired source wavelength.

To restate, a novel optical waveguide structure is presented wherein the core and cladding comprise physically distinct materials, which allows a laser/ASE source to be constructed from any solid-state active material. The channel waveguide geometry presented herein allows for fiber-delivered, high-power pumps which can translate into substantial output powers. Furthermore, the optical waveguide supports single mode or multi-mode fiber coupling of the broadband or narrowband output wavelength. Thus, ASE and laser sources implemented using this waveguide are suitable for test instrumentation in the telecommunications and cable television industries where single mode delivery is required, as well as imaging and spectroscopy applications where multi-mode fibers are used to handle high powers. Because physically distinct materials are employed in the optical waveguide, the present invention has the advantage that either laser glasses or laser crystals can be employed, which are inherently more stable and less prone to noise due to amplitude fluctuations. Further, the invention is not limited to similar materials of any kind, as in other types of waveguide sources. An optical waveguide in accordance with this invention can be produced at significantly lower costs compared with other waveguide approaches, and can be readily miniaturized.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

Generally stated, a novel optical waveguide structure is presented for a light emitting device which can be used in multiple configurations, for example, as a broadband amplified spontaneous emission (ASE) source or as a laser source. Note that as used herein, and in the appended claims, the terms "light" and "radiation" are intended to encompass both visible and non-visible light, including infrared and ultra-violet radiation. The light emitting device (also referred to as the light emitting source or ASE/laser source) of the present invention comprises appropriate optically reflective coatings on each end of the novel optical waveguide structure. A unique fabrication approach allows the ASE/laser source to be constructed from any solid-state active material. As described in the above-incorporated, co-filed patent application, the general fabrication process involves lapping and polishing various sub-assemblies to obtain core sizes on the order of 30 $\mu$m×30 $\mu$m and up to, e.g., 30 mm in length, using any active material (such as doped crystals or doped glasses)

The channel waveguide geometry disclosed herein allows for fiber-delivered, high-power pumps which can translate into substantial output powers. The waveguide geometry of the present invention also supports single mode or multi-mode fiber coupling of the output energy. Thus, the lasers and ASE sources presented are suitable for imaging and spectroscopy applications where multi-mode fibers are used to handle high powers, as well as test instrumentation for the telecommunications and cable television industries where single mode delivery is required.

Figure 1:
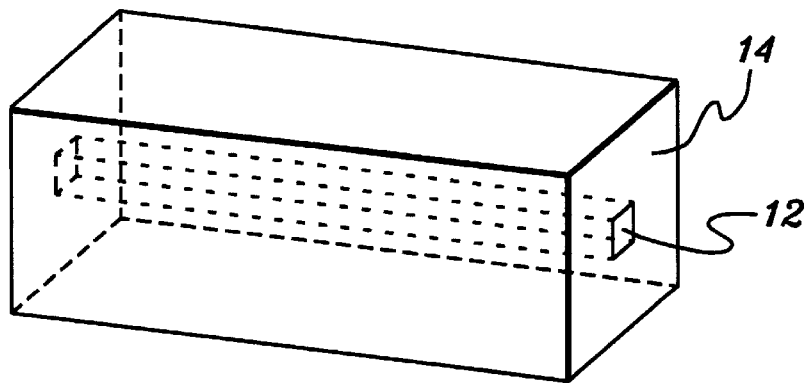
FIG. 1 depicts one embodiment of an optical waveguide wherein the core and cladding comprise physically dissimilar materials in accordance with the present invention.

FIG. 1 depicts one embodiment of an optical waveguide, generally denoted 10, in accordance with the principles of the present invention. Structure 10 includes a core 12 of active material surrounded by a cladding 14 comprising a dissimilar material than the core. As used herein, the phrase "dissimilar material" means that the material comprising the cladding and the material comprising the core are structurally and/or chemically distinct having been separately fabricated as physically different materials and brought together during the assembly process for the optical waveguide 10 as described in the above-incorporated application.

Briefly summarized, fabrication of optical waveguide 10 is a multi-step process using precision lapping and polishing techniques to mechanically thin the selected optical material (i.e., core) to the desired thickness in both the lateral and vertical directions. Optical adhesives are used to bond the channel waveguide to the surrounding support/cladding media. The fabrication process may include preparing a flat, optical surface on both the chosen optical material (i.e., core) and the chosen support substrate (i.e., cladding). Fused silica may be used as a support substrate due to its ease of processing and low refractive index. In the case of very thin glue layers (<1 μm), for efficient waveguiding action, the channel must be surrounded by a lower refractive index material. Obviously, the refractive index of the selected optical material (core) determines the index range for the cladding or support regions. Other requirements of the surrounding medium are processing compatibility with the optical material, availability of the material, and adhesive bonding affinity. Fused silica meets these requirements, although a range of optical glasses are also ideal.

In the case of thick glue layers, the refractive index of the glue provides the cladding index and influences the waveguide properties. In this situation, the support substrates can be selected for their processing qualities irrespective of the refractive index. However, particular issues such as edge breakage and differential polishing rates between the glue and core/cladding materials must be considered in selecting appropriate glue thicknesses. If desired, parallel processing of samples can be performed at each step of the process flow.

In general, lapping and polishing stages use water-based slurries with varying particle sizes and types for precision material removal. Waveguide dimensions are monitored using a micrometer gauge and processing is terminated at the desired value. Accuracy to 1 μm can be achieved in this manner. The use of high precision polishing jigs allows exceptional flatness and parallelism over the waveguide surface area.

Typical dimensions may be in the range of 2–5 mm×2–5 mm cross-section with channel lengths of 5–20 mm, or longer. This size allows easy handling and mechanical fixturing of the chips during processing and optical testing. The end faces of the chips are optically polished to allow efficient optical power launching into and from the channel waveguide.

For a more complete discussion of the optical waveguide fabrication process employed, reference the above-incorporated application. The significant result for the present invention is that the core or active material comprises a "dissimilar material" from the cladding (which may either be considered as the support material itself or the support material in combination with the optical adhesive, or the optical adhesive itself, if sufficiently thick).

By way of example, an ASE source might employ in one embodiment an optical waveguide having an Nd:glass core 30 μm×30 μm surrounded by a fused silica cladding constructed as summarized above via lapping and polishing techniques and using a UV-cured optical adhesive. For example, glue type UVOA-45 manufactured by Armbruster Associates, Inc. of Summit, N.J. may be employed. This particular glue type comprises an ultra-violet cured, low-viscosity, optical adhesive.

Table I presents various waveguide examples for a 1300 nm ASE source in accordance with the present invention. Note that these combinations are provided by way of example only, and there are countless additional waveguide formations which are possible. In each formation, however, the core material and cladding material will comprise structurally and/or chemically distinct materials which have been separately fabricated from physically different materials that are then brought together during the assembly process of the optical waveguide.

TABLE I

| Cladding material | Core material |
| --- | --- |
| Fused silica (n = 1.45) | Nd-doped YAG (n = 1.81) |
| Soda-lime glass (n = 1.5) | Nd-doped YAG (n = 1.81) |
| Fused silica (n = 1.45) | Nd-doped phosphate glass (n = 1.56) |
| Fused silica (n = 1.45) | Cr-doped Forsterite (n = 1.56) |
| Fused silica (n = 1.45) | SFL6 doped glass (n = 1.76) |
| Magnesium fluoride (n = 1.38) | Lithium niobate (n = 2.2) |
| Fused silica (n = 1.45) | Lithium niobate (n = 2.2) |
| Soda-lime glass (n = 1.5) | Cr-doped YAG (n = 1.8) |

Figure 2:
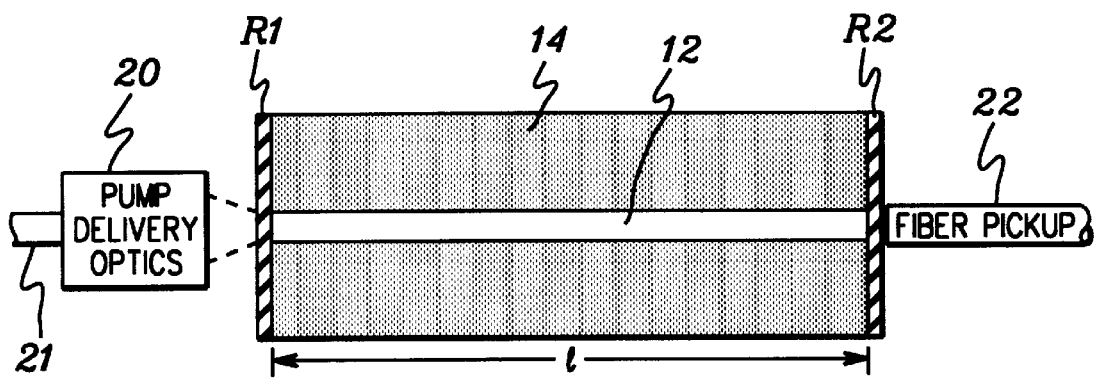
FIG. 2 is a schematic of one embodiment of a light emitting device in accordance with the principles of the present invention employing the optical waveguide of FIG. 1.

One embodiment of a light emitting device in accordance with the present invention is depicted in FIG. 2. This light emitting device includes the optical waveguide 10 of FIG. 1 having core 12 and cladding 14 constructed of physically distinct materials as noted above. A first end of optical waveguide 10 has a first optically reflective material Ri applied thereto, and a second end of optical waveguide 10 has a second optically reflective material R2 applied thereto. In practice, materials R1 and R2 will comprise different coatings (i.e., dielectric layers) as described further below. Pump energy, received on a multi-mode optic 21, is forwarded by pump delivery optics 20 through optically reflective material R1 into the core 12 of active material. Energy emitted from the device is collected across optically reflective material R2 into an optical fiber pick-up 22 disposed collinear with core 12 as shown.

The channel waveguide device of FIGS. 1 & 2 uses the process of stimulated emission to generate amplified spontaneous emission (ASE) or laser radiation. A pump source is used to excite atoms in the core (i.e., active material) of the waveguide which then emit. If pump power is below the lasing threshold of the system, and a broadband emitting material is used as the core, an ASE source is produced. However, if the system is designed such that the pump power is sufficient to push the system above the lasing threshold, then a laser is produced. The factors determining the threshold condition are described below.

The general light emitting device architecture includes the coated waveguide structure of FIG. 2. This symmetric waveguide is composed of a core which is fabricated (via lapping and polishing as described in the above-incorporated application) from an active material and surrounded on all sides by an identical cladding. The cladding is formed from a material with an index of refraction that is lower than the index of refraction of the core. This optical waveguide is the gain medium of the light emitting device. The gain cavity is formed by placing the reflective coatings on the two end faces of the optical guide. For both the laser and ASE source, coating R1 on the pump side of the source is highly reflective at the wavelengths of interest, i.e., either broadband for the ASE device or narrowband for the laser device. Coating R1 is also anti-reflecting (i.e., transparent) at the pump wavelength and any other wavelengths with significant gain, but where light emission is undesirable.

As a specific example, coating R1 may be anti-reflective at 795–805 nm and 1000–1100 nm at normal incidence, while highly reflective (i.e., reflectance>99%) at 1290–1390 nm at normal incidence. Coating R1 may be fabricated by low temperature deposition (T≦150° C.), and preferably can accommodate high incident laser power (at 800 nm).

One embodiment of the deposition process for coating R1 (as well as coating R2) would be as follows:

waveguide surfaces are cleaned via a process of repeated wiping of the end surfaces of the optical waveguide with solvent-soaked lens tissue;

the waveguide is placed in a vacuum chamber with the end to be coated facing a source (or "target") which is a pellet of the deposition material in bulk form;

the chamber is evacuated;

the source is then heated using a high-energy plasma such that the surface of the source emits a vapor;

once the vapor is formed, the atoms in the vapor travel ("line of site") to the waveguide and form a cohesive film on the end surface. The source remains heated and emissive until the desired film thickness, determined by an independent monitor, is reached; and the process is repeated for the various materials which compose the dielectric stack that ultimately forms the reflective coating R1 (or coating R2).

Figure 3A:
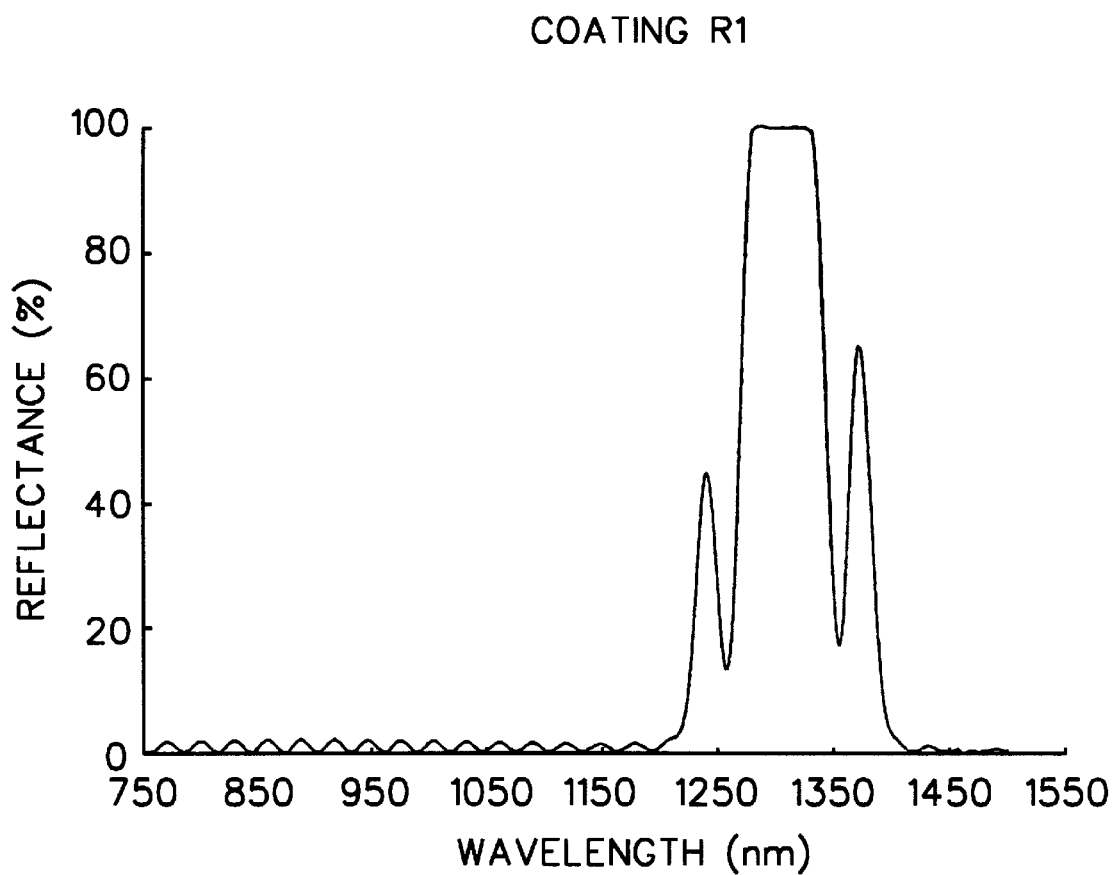
FIGS. 3a & 3b graphically depict reflectance of a first coating R1 at a first end of the light emitting device of FIG. 2, and reflectance of a coding R2 at a second end of the light emitting device of FIG. 2, respectively, in accordance with one embodiment of the present invention.

FIG. 3a graphic ally depicts reflectance versus wavelength for one dielectric stack useful as coating R1 in a light emitting device in accordance with the present invention. Dielectric stacks achieving this reflectance may be ordered, for example, from Cascade Optical Coatings, Inc. of Santa Ana, Calif.

An ASE and laser light emitting device in accordance with the present invention would differ substantially in the coatings R2 applied to the second or opposite end surface of optical waveguide 10. For a laser source, the transmission/reflectance of coating R2 is determined so that at easily achievable pump powers the round-trip gain in the optical waveguide 10 will equal the losses at each end of the waveguide through coatings R1 and R2, as well as any losses due to waveguide propagation. This is known as the lasing threshold. Second coa ting R2 is also chosen to achieve sufficient output power, which may not necessarily be the same coating that achieves the lowest threshold pump power for the laser source.

For an ASE source, coating R2 is chosen so that the threshold condition requires a slightly higher pump power than is delivered to the waveguide by the pump laser. Thus, the spontaneous emission which normally leads to lasing in a low-loss cavity, is generated at much higher powers due to the higher loss (i.e., lower reflectance at coating R2) in the cavity of the ASE source.

Figure 3B:
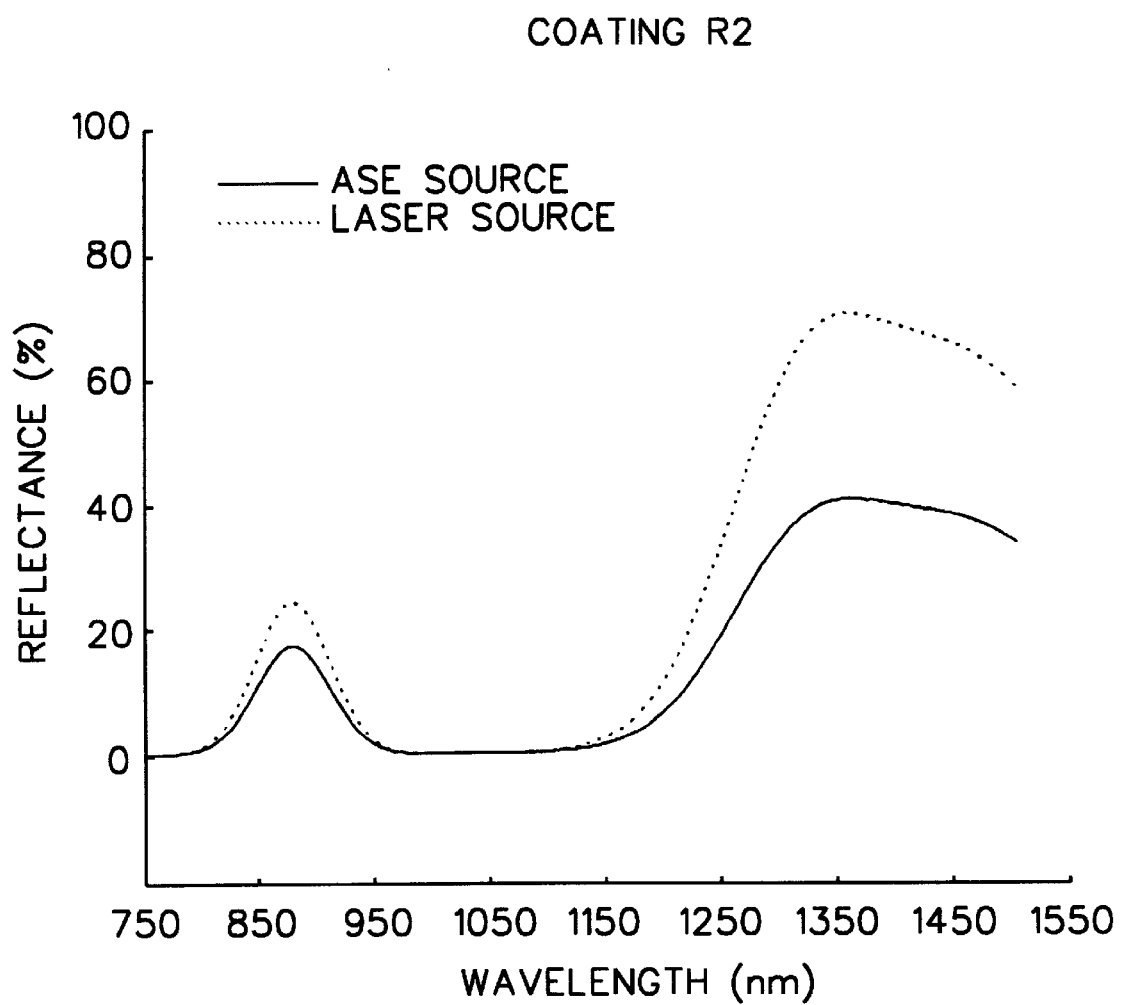

FIG. 3b depicts reflectance versus wavelength for possible dielectric stacks comprising coating R2 in both an ASE source and a laser source implementation. Again, these dielectric stack characteristics can be obtained, for example, from Cascade Optical Coatings, Inc. of Santa Ana, Calif. Note from FIG. 3b, that the reflectance of coating R2 is significantly higher for a laser source in the 1300 nm range, than for the ASE source.

In both an ASE device and a laser device in accordance with this invention, the pump light is delivered through coating R1 using appropriate optics 20 (FIG. 2) to obtain highly efficient coupling into the waveguide geometry. This may be facilitated by using a multi-mode fiber to deliver the pump energy and using aspheric lenses to focus the energy to the necessary dimensions. In another embodiment, radiation from a pump diode may be focused directly into the waveguide using a series of cylindrical lenses.

The optical channel waveguide light emitting device in accordance with this invention has been experimentally demonstrated in both laser and ASE source configurations using neodymium-doped (Nd) gain media. The light emitting device has been demonstrated as an ASE source in the 1300 nm window of standard, single-mode optical fiber. As such, it has applications as a test instrument for the telecommunications and cable television industries. In addition, it also has potential uses as a low-coherence source for optical coherence tomography (OCT), fiber gyroscopes, and fiber sensors.

The source has been demonstrated as a laser in Nd:YAG at 1064 nm and in Nd:glass from 1345 to 1370 nm. As a laser, the device also has numerous applications. Because of the ability to couple the output into a fiber, the laser source would be ideal for creating an all solid-state source for communications, including those set to ITU standards for multi-wavelength systems. In addition, because the laser sources are miniaturized and can be included in the same packaging as the laser diode itself, any application requiring high power in small packages will be met by a system pursuant to this invention.

Figure 4:
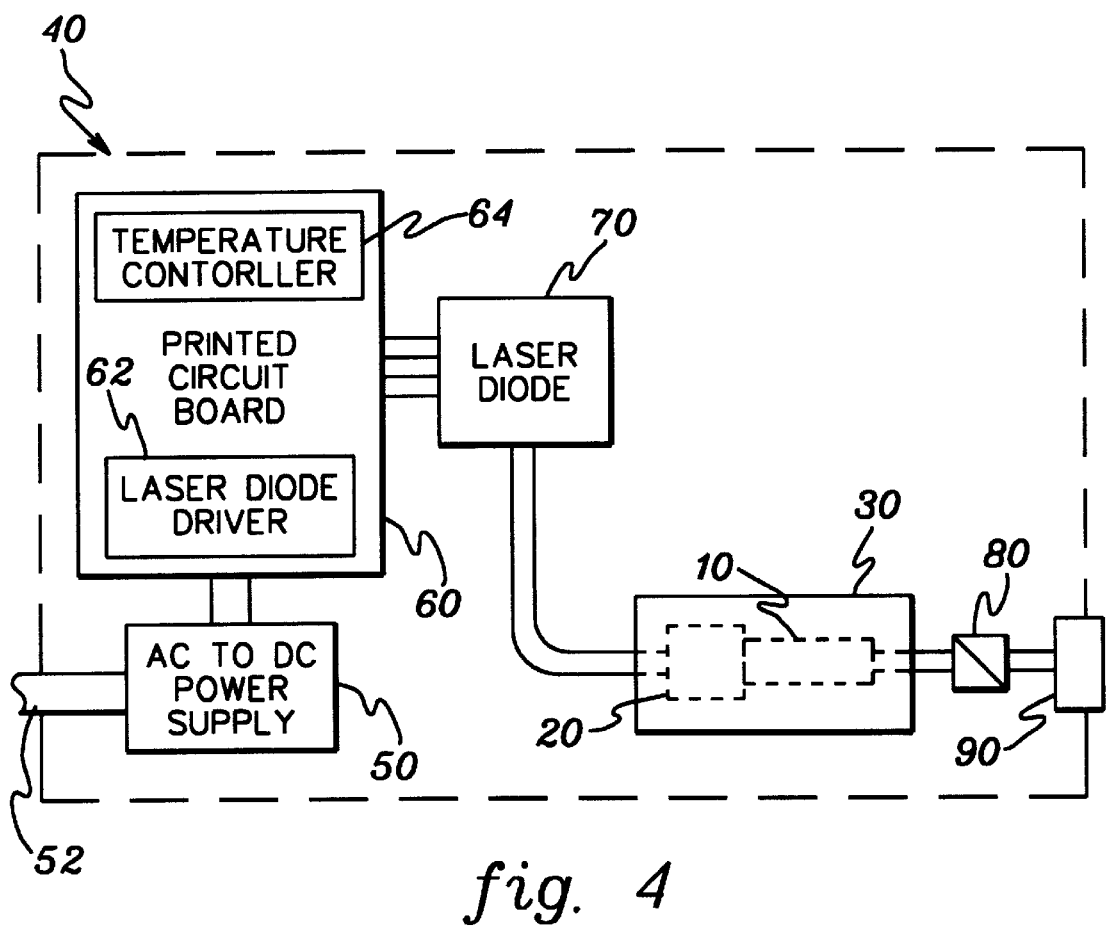
FIG. 4 is a schematic of one embodiment of a fiber optic communications test instrument in accordance with the present invention employing the light emitting device of FIG. 2.

FIG. 4 depicts one embodiment of a test instrument, denoted 40, in accordance with the present invention. This test instrument employs a light emitting device 30 having an optical waveguide 10 and pump delivery optics 20 as described above. Pump energy is provided by a laser diode 70 which is coupled to and controlled by a printed circuited card 60 having a laser diode driver 62 and temperature controller 64. The laser diode driver 62 is itself driven by an AC to DC power supply 50 which may be plugged (via line 52) into a standard wall outlet. Radiation emitted from the light emitting source 30 may, in one example, be filtered 80 before being provided through a bulkhead connector 90 to a communication system (not shown) under test. Pump energy can be delivered from laser diode 70 via a multi-mode fiber and source emitted radiation can be picked up from optical waveguide 10 through a single mode fiber or multi-mode fiber at the output end of the optical waveguide across coating R2 as described above.

As specific examples, the AC-to-DC power supply 50 may comprise supply Model No. RBS42 manufactured by Aztec America, Inc. of Carlsbad, Calif. The laser diode driver 62 and temperature controller 64 can be Model Nos. PLD-5000 and HTC-3000, respectively, from Wavelength Electronics of Bozeman, Mont. Laser diode 70 may comprise diode Model No. OPC-A001-802-FC/100 manufactured by Opto Power Corp. of Tucson, Ariz. Pump delivery optics 20 can comprise optics Model No. C230260P-B manufactured by Thorlabs, Inc. of Newton, N.J. Finally, in-line filter 80 can be readily constructed by one skilled in the art to filter unwanted wavelengths, and bulkhead connector 90 can comprise connector Model No. 501506-2 manufactured by Amp, Inc. of Harrisburg, Pa. Again, the above components are presented by way of example only.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. An optical waveguide comprising:
   a core fabricated of a first material having a first index of refraction, said first material comprising an active material which emits radiation at a desired wavelength when pumped with radiation of a predetermined wavelength;
   a cladding attached to and at least partially surrounding said core, said cladding being fabricated of a second material having a second index of refraction, said second index of refraction being lower than said first index of refraction; and
   wherein said first material and said second material comprise dissimilar materials.

2. The optical waveguide of claim 1, wherein said first material comprises a glass and said second material comprises a fused silica.

3. The optical waveguide of claim 2, further comprising an optical adhesive disposed between said core and said cladding.

4. The optical waveguide of claim 2, wherein said first material comprises a phosphate glass.

5. The optical waveguide of claim 1, wherein said optical waveguide is a light emitting source, and wherein said core comprising said active material is a gain medium of said light emitting source.

6. The optical waveguide of claim 5, wherein said light emitting source is one of an amplified spontaneous emission (ASE) light source or a laser light source.

7. The optical waveguide of claim 1, wherein said first material and said second material comprise at least one of structurally dissimilar materials and chemically dissimilar materials.

8. The optical waveguide of claim 7, wherein said first material comprises a crystalline material and said second material comprises an amorphous material.

9. The optical waveguide of claim 1, wherein said first material comprises one of a crystalline material and a glass material, and wherein said cladding is adhesively attached to said core using an optical adhesive, said optical adhesive having an index of refraction similar to said second index of refraction of said cladding.

10. The optical waveguide of claim 9, wherein said core comprises an elongate core surrounded on each side by said cladding, said elongate core having a transverse rectangular cross-sectional configuration or a transverse square cross-sectional configuration.

11. The optical waveguide of claim 1, wherein said optical waveguide comprises a channel waveguide, and wherein said cladding is adhesively attached to said core using an optical adhesive.

12. The optical waveguide of claim 1, wherein said radiation of said desired wavelength emitted by said optical waveguide comprises at least one of visible light and infrared radiation.

13. The optical waveguide of claim 1, wherein said cladding comprises a thick layer of optical adhesive attached to and at least partially surrounding said core, said optical adhesive having said second index of refraction.

14. A radiation emitting device comprising:
an optical waveguide having a first end and a second end, and including:
a core fabricated of a first material having a first index of refraction, said first material comprising an active material which emits radiation at a desired source wavelength when pumped with radiation of a predetermined wavelength;
a cladding attached to and at least partially surrounding said core, said cladding being fabricated of a second material having a second index of refraction, said second index of refraction being lower than said first index of refraction;
said first material and said second material comprising dissimilar materials;
a first optically reflective material disposed over said first end of said optical waveguide;
a second optically reflective material disposed over said second end of said optical waveguide; and
wherein said first optically reflective material allows pump radiation at said predetermined wavelength into said optical waveguide, and said second optically reflective material allows radiation emission from said optical waveguide at said desired source wavelength.

15. The radiation emitting device of claim 14, wherein said cladding is adhesively attached to said core using an optical adhesive, said optical adhesive having an index of refraction similar to said second index of refraction of said cladding.

16. The radiation emitting device of claim 15, wherein said core comprises an elongate core and said cladding surrounds each side of said elongate core, and wherein said elongate core is rectangular in transverse cross-section or square in transverse cross-section.

17. The radiation emitting device of claim 16, wherein said optical waveguide comprises a channel waveguide.

18. The radiation emitting device of claim 14, wherein said desired source wavelength comprises one of a broadband amplified spontaneous emission (ASE) wavelength or a laser wavelength.

19. The radiation emitting device of claim 18, wherein said desired source wavelength comprises said broadband ASE wavelength, and wherein said second optically reflective material is substantially transparent to said broadband ASE wavelength.

20. The radiation emitting device of claim 18, wherein said desired source wavelength comprises said laser wavelength, and said second optically reflective material is transparent within a narrowband at said laser wavelength.

21. The radiation emitting device of claim 14, further comprising a radiation pump optically coupled to said optical waveguide for providing pump radiation at said predetermined wavelength to said core through said first optically reflective material.

22. The radiation emitting device of claim 21, further comprising an optical pick-up fiber disposed adjacent to said second optically reflective material and substantially collinear with said core of said optical waveguide to pick up at least a portion of radiation emitted through said second optically reflective material at said desired source wavelength.

23. The radiation emitting device of claim 14, wherein said first material and said second material comprise at least one of structurally dissimilar materials and chemically dissimilar materials.

24. A method for fabricating a radiation emitting device comprising:
forming an optical waveguide having a core comprising a first material with a first index of refraction and cladding adhesively attached to and at least partially surrounding said core, said cladding comprising a second material with a second index of refraction, wherein said second index of refraction is lower than said first index of refraction, and wherein said first material comprises an active material which exhibits optical fluorescence when stimulated and said first material and said second material comprise structurally or chemically dissimilar materials;
applying a first optically reflective material over a first end of said optical waveguide, wherein said first optically reflective material is fabricated to allow pump energy at a predetermined wavelength into said optical waveguide; and
applying a second optically reflective material over a second end of said optical waveguide, wherein said second optically reflective material is fabricated to allow radiation emission from said optical waveguide at said desired source wavelength.

* * * * *